United States Patent [19]

Wulff et al.

[11] Patent Number: 5,235,035
[45] Date of Patent: Aug. 10, 1993

[54] PROCESS FOR LOWERING THE CRYSTALLIZATION TEMPERATURE OF POLYARYLENE SULPHIDES

[75] Inventors: Claus H. Wulff; Ernst-Ulrich Dorf, both of Krefeld, Fed. Rep. of Germany

[73] Assignee: Bayer Aktiengesellschaft, Leverkusen, Fed. Rep. of Germany

[21] Appl. No.: 620,758

[22] Filed: Dec. 3, 1990

[30] Foreign Application Priority Data

Dec. 15, 1989 [DE] Fed. Rep. of Germany ....... 3941378

[51] Int. Cl.$^5$ ............................ C08F 6/00; C08G 6/00
[52] U.S. Cl. ................................. 528/499; 528/480; 528/503
[58] Field of Search ................ 528/480, 503, 499

[56] References Cited

U.S. PATENT DOCUMENTS 4,771,120  6/1988  Alewelt et al. .................. 528/388
5,010,169  1/1991  Kohler et al. ................... 528/388

FOREIGN PATENT DOCUMENTS 0129202  12/1984  European Pat. Off. .
0229626  7/1987   European Pat. Off. .
0259189  3/1988   European Pat. Off. .
0279217  8/1988   European Pat. Off. .
0339424  11/1989  European Pat. Off. .

Primary Examiner—John Kight, III
Assistant Examiner—T. Mosley
Attorney, Agent, or Firm—Connolly and Hutz

[57] ABSTRACT

This invention relates to a process for lowering the crystallization temperature of polyarylene sulphides.

5 Claims, No Drawings

PROCESS FOR LOWERING THE CRYSTALLIZATION TEMPERATURE OF POLYARYLENE SULPHIDES

This invention relates to a process for lowering the crystallization temperature of polyarylene sulphides, preferably polyphenylene sulphides.

Polyarylene sulphides and methods for their preparation are known (e.g. EP-A 171 021).

Polyarylene sulphides are partially crystalline polymers with high dimensional stability under heat which can be processed thermoplastically. They are also highly chemically resistant.

Delayed onset of crystallization of the molten polymer is desirable for certain purposes, for example for avoiding premature solidification of the flow front of the molten polymer when it is being poured out of moulds.

It has now been found that the crystallization temperature ($T_{mc}$) of certain polyarylene sulphides (PAS), particularly of special PPS, can be lowered as desired by a certain thermal treatment.

The present invention therefore relates to a process for lowering the crystallization temperature $T_{mc}$ of polyarylene sulphides, characterised in that the polyarylene sulphide is repeatedly heated over a temperature range of from $T_1 = 180°$ C. to $T_2 \geq 300°$ C. and is kept at temperature $T_2$ for a period from 10 seconds to 30 minutes.

According to the invention, the polyarylene sulphides used, preferably polyphenylene sulphide, have weight average molecular weights $M_{w(rel)}$ and melt viscosities $\eta_m$ determined) at 306° C., shear stress $\tau = 100$ Pa) related according to the following equation:

$$\lg \eta_m = 3.48 \cdot \lg M_w - 14.25 \pm 0.1,$$

preferably $$\lg \eta_m = 3.48 \cdot \lg M_w - 14.25 \pm 0.05.$$

Polyarylene sulphides suitable for the purpose of this invention have been disclosed, e.g. in EP-A 171 021.

In the process according to the invention, the PAS is heated any number of times, preferably twice, over the temperature range of from $T_1$ to $T_2$ at any desired heating rate but preferably at the rate of less than 40° C. per minute.

When carrying out the process, any length of time from a few seconds to many weeks may be interposed between the individual heating processes and during these intervals the compounds may be kept at any temperature below 180° C.

The interval between two heating processes is preferably from 5 seconds to 4 hours.

The heating processes according to the invention (thermal treatment) may be carried out in any apparatus which enable the temperatures required according to the invention to be reached. Examples of such apparatus include DSC apparatus, heating ovens, heating chambers, extruders (double)screw shaft extruders, injection moulding machines, kneaders, heating dishes, rotary furnaces, heatable rollers, hot air ovens, contact furnaces, fiber spinning machines, film blowing and rolling apparatus, calenders, compression moulds, reverberatory furnaces, infrared radiant heaters, microwave radiant heaters, plasma apparatus, electromagnetic and mechanical heat generators, sources of neutrons, etc..

The thermal treatment of the PAS may be carried out either continuously or discontinuously.

The polyarylene sulphides treated by the process according to the invention are distinguished by the onset of crystallization at a lower temperature (about 150° to 220° C.) for substantially the same crystallinity and the same melting properties. The process according to the invention lowers the $T_{mc}$ by 10° to 50° C. This facilitates various processes, e.g. the working up into films and fibers and into injection moulded parts with a long flow length or small cross-sections.

Polyarylene sulphides which have been treated according to the invention may be mixed with other polymers or with pigments and fillers such as graphite, metal powders, glass powder, quartz powder, fused quartz, glass fibers or carbon fibers before, during or after the heat treatment or they may be mixed with stabilizers or mould release agents conventionally used for polyarylene sulphides.

The melt viscosity $\eta_m$ of the polymer melt (in Pa.s) in dependence upon the shear stress (in Pa) was determined at 306° C. with the aid of an Instron Rotation viscosimeter.

This method enables the melt viscosity to be determined over a very wide range of from $10^{-1}$ to $10^7$ Pa.s. In the Instron Rheometer, the polymer is melted between a fixed plate and a rotating cone and the torque of the cone is determined. The melt viscosity in dependence upon the shear stress can be calculated from the torque, the angular velocity and the data of the apparatus. Rheometer Model 3250 of Instron was used.

The figure given for the melt viscosity is that which was determined at a shear stress of $\tau = 10^2$ Pa.

The crystallization points ($T_{MC}$ in ° C.) were measured by DSC (=differential scanning calorimetry) at cooling rates of 20 K/min in a commercially available measuring apparatus.

The polyarylene sulphides treated according to the invention generally have melt viscosities of from $0.1 \times 10^1$ to $5 \times 10^4$ Pa.s, preferably from $0.1 \times 10^1$ to $1.5 \times 10^3$ Pa.s. They may be worked up directly by extrusion, extrusion blowing, injection moulding or other conventional processing techniques to form films, fibers or moulded articles. These products may be used for the usual applications, e.g. as parts of motor vehicles, dash boards, electrical parts such as switches, electronic boards and other electronic components, chemically resistant and weather resistant parts and apparatus such as pump housings and pump impellors, dishes for etching baths, sealing rings, parts of office machinery and telecommunication apparatus, household appliances, etc..

EXAMPLES

Samples of PPS, in each case about 10 mg, are investigated in a commercial DSC apparatus of Mettler. The heating rates and results are shown in the following Table:

| Example | Heating rate 1 K/min[a] | $T_{mc}1$ °C. a | Heating rate 2 K/min Δ c | $T_{mc}2$ °C. d | $T_1$[a] °C. |
|---|---|---|---|---|---|
| 1 | 20 | 222 | 5 | 198 | 150 |
| 2 | 20 | 224 | 10 | 201 | 150 |
| 3 | 20 | 224 | 10 | 203 | 150 |
| 4 | 20 | 224 | 10 | 207 | 25 |

-continued

| Example | Heating rate 1 K/min[a] | $T_{mc}1$ °C. a | Heating rate 2 K/min Δ c | $T_{mc}2$ °C. d | $T_1$[a] °C. |
|---|---|---|---|---|---|
| 5 | 20 | 224 | 20 | 203 | 25 |
| 6 | 20 | 225 | 20 | 201 | 25 |
| 7 | 20 | 227 | 40 | 208 | 150 |
| 8 | 20 | 226 | 40 | 206 | 150 |
| 9 | 20 | 229 | 40 | 209 | 25 |

[a] starting from $T_1$, the samples were heated to $T_2 = 360°$ C. and maintained at $T_2$ for 5 minutes.

We claim:

1. A process for lowering the crystallization temperature of polyarylene sulphide which consists essentially of repeatedly heating polyarylene sulphide in a plurality of steps each step comprising heating over a temperature range of from 180° C. to temperature $T_2 \geq 300°$ C. whereupon the temperature $T_2$ is maintained for a period of from 10 seconds to 30 minutes wherein the polyarylene sulphide produced has a weight average molecular weight $M_{w(rel)}$ and melt viscosity $\eta_m$ as follows:

$$\lg \eta_m = 3.48 \cdot \lg M_w - 14.25 \pm 0.1.$$

2. A process as claimed in claim 1, wherein the polyarylene sulphide produced as a weight average molecular weight $M_{w(rel)}$ and melt viscosity $\eta_m$ as follows:

$$\lg \eta_m = 3.48 \cdot \lg M_w - 14.25 \pm 0.05.$$

3. A process as claimed in claim 1, wherein the polyarylene sulphide have melt viscosities of from $0.1 \times 10^1$ to $5 \times 10^4$ Pas.

4. A process as claimed in claim 1, wherein the polyarylene sulphide have melt viscosities of from $0.1 \times 10^1$ to $1.5 \times 10^3$ Pas.

5. The process according to claim 1, wherein the polyarylene sulphide is polyphenylene sulfide.

* * * * *